ically inedible animal by-products to form a mixture

United States Patent [19]
Cagle

[11] 3,882,257
[45] May 6, 1975

[54] PREPARATION OF PET FOOD FROM BONES AND ANIMAL BY-PRODUCTS

[75] Inventor: J. Douglas Cagle, East Point, Ga.

[73] Assignee: Cagle's, Inc., Atlanta, Ga.

[22] Filed: Aug. 27, 1973

[21] Appl. No.: 392,041

Related U.S. Application Data

[63] Continuation of Ser. No. 155,268, June 21, 1971, abandoned.

[52] U.S. Cl. .............. 426/274; 426/212; 426/646; 426/465; 426/805; 426/657
[51] Int. Cl. ............................................. A23k 1/10
[58] Field of Search .......... 426/146, 805, 456, 513, 426/448, 212, 141, 364, 371, 382, 465

[56] References Cited
UNITED STATES PATENTS

| | | | |
|---|---|---|---|
| 982,711 | 1/1911 | Ellis | 99/2 |
| 2,622,027 | 12/1952 | Torr | 99/7 |
| 3,004,852 | 10/1961 | Rothschild | 99/7 |
| 3,115,409 | 12/1963 | Hallinan et al. | 99/7 |
| 3,119,691 | 1/1964 | Ludington | 99/2 |
| 3,359,115 | 12/1967 | Lanz | 99/7 |
| 3,623,884 | 11/1971 | Haas | 99/7 |

*Primary Examiner*—Norman Yudkoff
*Assistant Examiner*—Curtis P. Ribando
*Attorney, Agent, or Firm*—Newton, Hopkins & Ormsby

[57] ABSTRACT

A pet food product and a method of preparing same including the steps of forming a slurry of a mixture of inedible animal by-products comprising bones, skins, lungs, livers, hearts, kidneys, heads and feet; adding a binder to said slurry and dehydrating said slurry until a preselected moisture content in said slurry is reached. The product can be in the form of a hard bone substitute for pets or in powdered form for addition to a pet's soft foods.

1 Claim, No Drawings

PREPARATION OF PET FOOD FROM BONES AND ANIMAL BY-PRODUCTS

This is a continuation of application Ser. No. 155,268, filed 6-21-71, and now abandoned.

BACKGROUND OF THE INVENTION

This invention relates to a pet food product and more particularly to a dog food and a method of preparing the same.

In the past, whenever inedible animal by-products including bones, skins, lungs, livers, hearts, kidneys, heads and feet were utilized to form a food product, the protein, calcium and minerals present in these by-products were usually lost or destroyed by high pressure processing.

SUMMARY OF THE INVENTION

Briefly described, the present invention provides a pet food product and a method of preparing the same comprising a dehydrated slurry of a mixture of inedible animal by-products.

It is, therefore, a primary object of the present invention to provide a pet food product and a method of preparing the same which employs a slurry of a mixture of inedible animal by-products.

Another object of the present invention is to provide a pet food product which can be in the form of a bone chewing substitute or in powdered form for addition to the soft foods of pets.

A further object of the present invention is to provide a pet food product which has a higher content of protein, calcium and minerals than previous products prepared from inedible animal by-products.

A still further object of the present invention is to provide a pet food product which is easy to prepare and low in cost.

Still other objects and advantages of the present invention will become apparent in the light of the following selected illustrative embodiment of the invention.

DESCRIPTION OF THE INVENTION

This invention is carried out by first obtaining the inedible by-products of animals including swine, cattle, poultry and fish. The term "swine" includes hogs and pigs. The term "poultry" includes turkey, chicken, ducks, geese and the like. The by-products include bones, skins, lungs, livers, hearts, kidneys, heads and feet. These particular items are not usually further processed for human consumption. However, since they are so rich in essential protein, calcium and minerals, they can be utilized for animal food and, more particularly, for pet food.

A mixture of these by-products is first prepared utilizing any combination of the above mentioned materials. There need not be any separation of the by-products as to source (i.e., the poultry by-products can be mixed in with the fish by-products, etc.).

Various machinery including grinders, breakers, disintegrators and choppers are employed to bring this mixture of raw material into an uncoagulated mass.

This mass is then placed in a suitable mixing means. Salt is added to the mixture which, in combination with the high protein content of the by-products, forms a binder for the material. The binder has an adhesive effect and binds the pieces of by-products together in a cohesive mass so that the material has the appearance and behavior of a unitary product. No other specific binder material other than salt need be added.

At this point, a vegetable protein may be added to the mixture. However, there are enough amounts of vitamins and minerals present in the by-products themselves that no other additional nutriment need be added.

Into this slurried mixture, any U.S.D.A. certified coloring, seasoning, or flavoring may be added. The slurry is then passed through a de-aerification means to remove any air bubbles trapped in the mixture.

The next step in the process depends on what form it is desired the ultimate product should assume. If the product is to be added to a pet's soft foods, then the slurry can be placed in a machine which will extrude it in small pellet form. If the product is to be used as a hard bone substitute for pets to chew on, then the slurry can be placed in a suitable machine which will compress and shape it into various predetermined forms and sizes.

The slurry, either extruded or shaped, is then placed on expanded metal trays and put into dehydrating ovens which are maintained at a temperature between 90° F. to 140° F. The length of dehydration time depends upon the thickness of the extruded or shaped slurry, but the time should be sufficient so that the finished product has a moisture content of between 6 and 8 percent by weight.

If the dehydrated slurry is in pellet form, these pellets can be pulverized into a powder that can later be added to a pet's soft food. From 5 to 50 percent by weight of the powder can be mixed into the food.

In its hard pressed and shaped form, the dehydrated slurry can substitute for a bone to satisfy a dog's natural desire to chew bones. The bones will enable a dog to exercise his jaws and gums and help remove the tartar from his teeth. In either the powder or bone biscuit form, the final product contains approximately 40 percent natural animal protein.

ILLUSTRATIVE EXAMPLE

A specific example illustrative of the invention is as follows:

75 percent by weight of bones of various animals, and 23.5 percent of other inedible animal by-products such as livers, skins, hearts, lungs, kidneys, etc., were cut and chopped into fine pieces. 1.5 percent by weight of salt was added to the material, and the resultant mixture was slurried. The slurried material was then de-aerified. At this point, the slurry can either be extruded into pellets or shaped into the size and form of a dog biscuit. The slurry was then placed in dehydrating ovens which were maintained at a temperature in the range between 90°F. and 140°F. until the moisture content in the slurry was reduced to between 6–8 percent by weight. The product is then withdrawn from the ovens with further processing depending on what particular form the dehydrated slurry is in. If in pellet form, the product can be ground into a powder and packaged so that the consumer can easily add it to his pet's soft foods. If the product is in the form of a dog biscuit, it can then be placed in packages for use by the consumer as a bone substitute for his pet to chew on.

As can be seen, the above described method of processing inedible animal by-products ensures a higher concentration of protein, calcium and minerals in the finished product than previous high pressure processing of the by-products.

It is obvious that one skilled in the art may make modifications in the details of the method and product disclosed in the present invention without departing from the spirit of the invention which is set out in varying scope in the appended claims.

What is claimed is:

1. A method of preparing a pet food product comprising the steps of:
   a. forming a mixture yielding a finsihed product containing approximately 40 percent natural animal protein by mixing 75 percent by weight of bones of various animals with 23.5 percent by weight of animal by-products selected from the group consisting of livers, skins, lungs, hearts, kidneys, heads, feet and mixtures thereof;
   b. cutting and chopping the mixture of step (a) to form an uncoagulated mass;
   c. adding salt to said uncoagulated mass in amount sufficient to combine with the protein content thereof and form a binder, said salt being added in amount of 1.5 percent by weight;
   d. mixing the uncoagulated mass of step (b) and the added salt of step (c) to form a cohesive mass having the appearance and behavior of a unitary product;
   e. de-aerifying the cohesive mass of step (d) to remove any air bubbles trapped therein;
   f. compressing and forming the de-aerified cohesive mass into discrete and separate masses; and
   g. dehydrating said discrete and separate masses at a temperature of 90°F – 140°F to yield said finished product containing approximately 40 percent natural animal protein and having a moisture content between 6 and 8 percent by weight.

* * * * *